United States Patent [19]
Rosshirt

[11] 3,949,285
[45] Apr. 6, 1976

[54] TAPERED THREAD NUMERICAL CONTROL SYSTEM FOR A LATHE

[75] Inventor: Hermann Rosshirt, Bristol, Conn.

[73] Assignee: The Superior Electric Company, Bristol, Conn.

[22] Filed: Oct. 15, 1974

[21] Appl. No.: 514,845

[52] U.S. Cl. ................. 318/571; 318/573; 318/603
[51] Int. Cl.² ........................................ G05B 19/24
[58] Field of Search ................... 318/571, 573, 603

[56] References Cited
UNITED STATES PATENTS

| | | | |
|---|---|---|---|
| 2,964,252 | 12/1960 | Rosenberg | 318/571 X |
| 3,267,344 | 8/1966 | McDanial | 318/571 X |
| 3,278,817 | 10/1966 | Johnson et al. | 318/571 |
| 3,725,651 | 4/1973 | Cutler | 318/573 X |
| 3,734,421 | 5/1973 | Karlson et al. | 318/571 X |

*Primary Examiner*—B. Dobeck
*Attorney, Agent, or Firm*—Ernest M. Junkins

[57] ABSTRACT

A lathe numerical control system for cutting a tapered thread by a cutting tool that is moved along a rotating workpiece in steps on both a lead axis and a radius axis. Synchronism of movement along both axes with the workpiece rotation is achieved by an encoder producing a set number of pulses per revolution of the workpiece and these pulses are directed simultaneously to a lead axis path and a radius axis path with each path effectively dividing its encoder pulses to produce the steps needed for the tool movement to produce a thread for each revolution.

4 Claims, 1 Drawing Figure

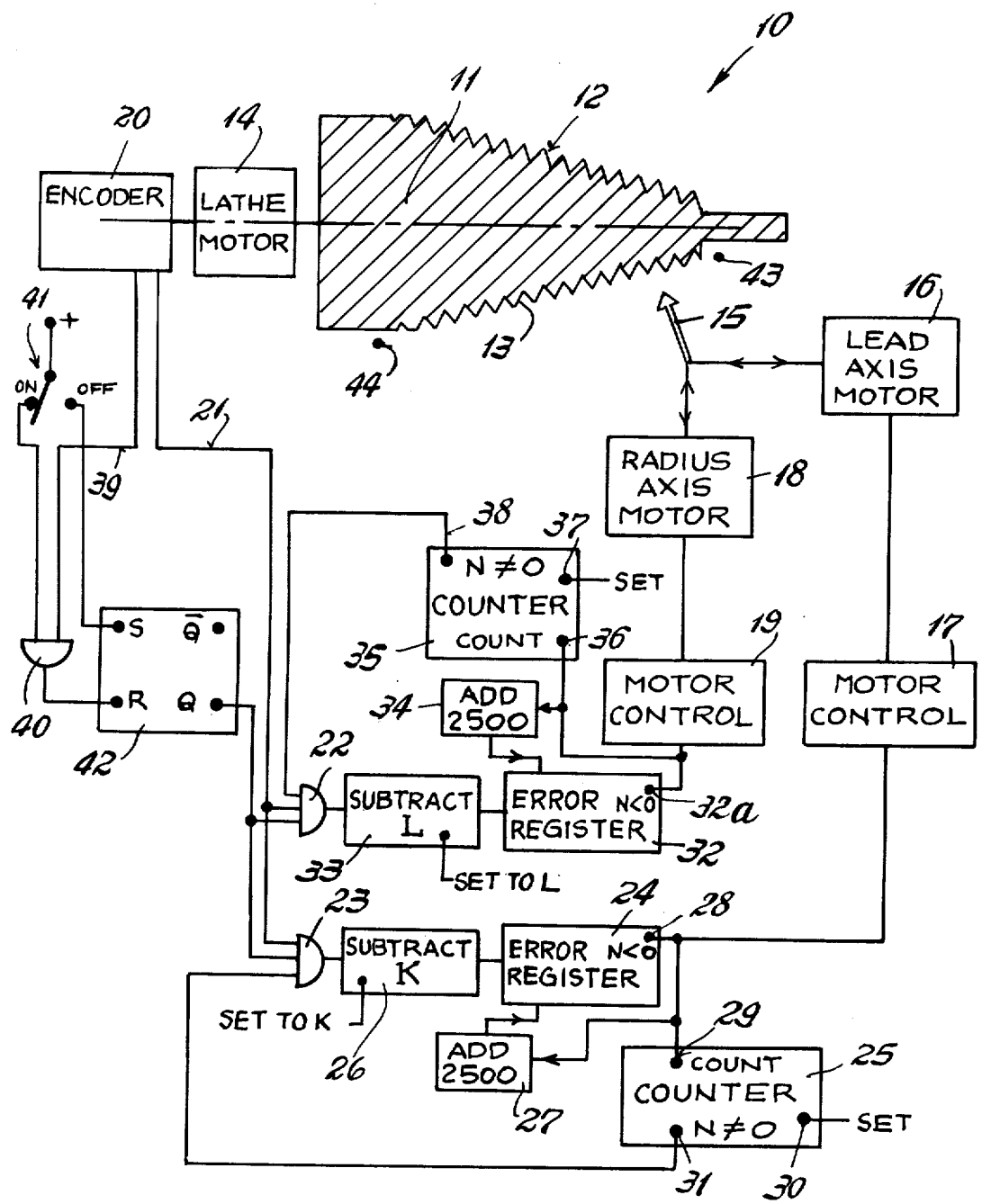

TAPERED THREAD NUMERICAL CONTROL SYSTEM FOR A LATHE

In the forming or cutting of threads on a workpiece rotated in a lathe, it is essential that the thread cutting tool be moved a set distance along the axis of the workpiece for each revolution of the workpiece in order to assure a constant thread lead. It has heretofore been suggested, in the forming of cylindrical threads by a numerical control system, that an encoder be connected to the revolving workpiece to produce a set number of pulses for each revolution. With the tool movement on the lead axis being in increments or steps, a divider was employed to divide the encoder pulses per revolution by a set number which produced the number of pulses and hence steps of the tool that equaled the lead of the thread with the tool steps occurring evenly throughout each revolution.

While such a system has been found satisfactory, it was limited to just cylindrical threads and could not cut threads which were tapered, the latter type of threads lying on a frustro-conical surface and requiring that the tool not only move synchronously along the lead axis with the workpiece rotation but also the tool must move perpendicularly thereto into and or away from the work along a radial axis of the workpiece for a set distance per revolution. Further, tool radius axis movement must be synchronized with both the workpiece rotation and the lead axis movement for a proper thread and also occur evenly throughout each revolution.

It is accordingly an object of the present invention to provide a numerical control system that is capable of cutting a tapered thread on a workpiece that is rotated in a lathe by moving the thread cutting tool along both a lead axis and a radius axis.

Another object of the present invention is to achieve the above object with a system that only requires a slight addition to a cylindrical thread cutting numerical control system to control the radius axis movement of the cutting tool.

A further object of the present invention is to provide a tapered thread cutting numerical control system which assures that movements of the workpiece and the cutting tool along both the lead and radius axes are synchronized, which is relatively economical to manufacture, is easily incorporated into a cylindrical thread system, is extremely simple in construction and is reliable in use.

In carrying out the present invention, there is provided a heretofore suggested numerical control system for a lathe that is only capable of cutting a cylindrical thread by the thread cutting tool being movable only along the lead axis of the workpiece as it is rotated. To assure synchronizm between workpiece rotation and cutting tool movement, the system uses an encoder that is rotated with the workpiece to produce a set number of pulses per revolution thereof and these pulses are introduced into a lead axis path. This path includes a motor connected to move the cutting tool an equal length step for each command pulse that it receives at its motor control and each command pulse is obtained after a set number of encoder pulses. Thus, the tool is moved a set number of steps for each rotation of the workpiece with the set number being in the program instructions for the numerical control system.

To the above system the present invention adds a radius axis path which is the same in construction as the lead axis path in that it includes a motor mounted, however, to move the tool radially of the workpiece an equal length for each command pulse that its motor control receives and each command pulse is obtained after a set number of encoder pulses. Thus the encoder pulses are simultaneously applied to both the lead axis path and to the radius axis path, each path dividing the encoder pulses for a revolution by a program instruction number that produces the steps needed for the movement by the tool that is required to produce the desired tapered thread.

In the drawing the sole FIGURE is a diagrammatic and block representation of the tapered thread cutting numerical control system of the present invention.

Referring to the drawing, the present invention is generally indicated by the reference numeral 10 and is shown in conjunction with a workpiece 11 having a frustro conical surface 12 in which it is desired to form a tapered thread 13. The workpiece 11 is mounted for rotational movement by way of a lathe motor 14. A thread cutting tool 15 is mounted for both movement along the axis of the workpiece to produce the lead of thread, said movement being left to right or vice versa in the drawing, and is also mounted for movement radially of the work, namely, into or away from the workpiece.

For producing the movement along the lead axis there is provided a lead axis motor 16 whose energization is controlled by a motor control 17, the latter changing the energization of the motor 16 for each command pulse it receives with a change of energization producing one incremental movement or step along the lead axis. Similarly the tool movement along the radius axis is controlled by a motor 18 which has a motor control 19, the latter producing a change of energization of the motor 18 for each command pulse it receives with each change of energization producing an equal length step. Not shown but incorporated herein is a means for controlling the direction in which each step is taken on each axis. One form of motor and motor control that is usable is shown in U.S. Pat. No. 3,553,549 assigned to the assignee of the present invention. While such a motor is disclosed as a stepping motor, other pulse to step motors, such as a digital D.C. servo may be employed if desired.

Mounted for rotation with the workpiece is an encoder 20 which produces a set number of evenly spaced pulses per revolution with one type producing 2500 pulses. The encoder pulses appear on a lead 21 and are directed to an AND gate 22 and simultaneously to another AND gate 23. The latter AND gate is in a lead axis path which includes an error register 24 and a counter 25. The lead axis path also has a register 26 which is set to the value of K, the number of steps along the lead axis that the motor 16 is to produce for each revolution of the workpiece. The register 26 is interconnected with the error register 24 so that for each encoder pulse received from the gate 23, it causes its value of K to be subtracted from the count in the error register.

Another register 27 is also connected to the error register and is set for the number of pulses that the encoder produces per revolution, here specifically 2500.

The error register has a terminal N<0, indicated by reference numeral 28 and each time the count of the error register becomes less than 0, a command pulse is produced at this terminal to the motor control 17. Also the command pulse is directed to the ADD 2500 register 27 and causes it to add 2500 to the count of the error register. Thus, with the error register set to a 0 count, the first encoder pulse will make the register negative (as it assumes a count of $-K$), a command pulse will be produced at the terminal 28, and the ADD 2500 register 27 will add 2500 to the count of the error register. This will make the count positive and it will so remain until a sufficient number of K values have been subtracted to make the count negative. Another command pulse will be produced, 2500 will be added to the error register count and it will be decreased until less than zero when the process is repeated.

With this structure, the number of command pulses produced will be equal in number to the number of steps commanded on the lead axis per revolution. Further, it will be noted that the first command pulse is produced with the first encoder pulse thereby initiating immediate motor movement. Thus if K has a value of 100, and there are 2500 encoder pulses per revolution, then, there will be 100 command pulses produced per revolution.

The counter 25 in the lead axis path may also include a count terminal 29 which receives command pulses. It is initially set to a number supplied to its terminal 30 with the number being the number of steps that the lead axis motor 16 is to produce in its total command movement. Further, the counter has an N not equal to zero terminal 31 which is connected as another input to the AND gate 23. The counter 25 counts down one count for each command pulse received.

Similarly the radius axis path has an error register 32 and a register 33 set to the value of L and connected between the register 32 and the encoder pulses from the gate 22. An ADD 2500 register 34 is also provided while the error register has an N<0 terminal 32a on which command pulses for the radius axis motor appear. The error register 32 and registers 33 and 34 function to subtract the value of L for each encoder pulse, add the value of 2500 for each command pulse and produce a command pulse each time the error register becomes negative. Thus the number of L command pulses are produced evenly for each revolution. Additionally, a counter 35 is provided which receives command pulses on its terminal 36 and also receives on a terminal 37 the number of steps that the radius axis motor 18 is to produce. As with the counter 25, the counter 35 has a lead 38 that connects an N not equal to zero terminal as an input of its AND gate 22.

With the above construction, if it is desired to produce a tapered thread with a 40 pitch lead and the taper angle being 30°, and if the encoder producing 2500 pulses per revolution and each increment of movement produced by the motors 18 and 16 is equal to 0.0001 inches, then the value of K is set at 250 to produce 250 steps per revolution or 0.025 inches of movement which is equal to the lead of the thread. For the value of L, i.e., the taper angle, 144 steps are needed per revolution which requires that the value of L be set to 144. Accordingly, one revolution of the workpiece will cause the divider 24 to produce 250 command pulses and the divider 32 to produce 144 command pulses. It will be noted that the pulses are evenly spread over the duration of a revolution thereby assuring that not only are the steps spread evenly on each axis but also the movement along the radius axis is in synchronism with the movement along the lead axis and both are in synchronism with the rotating workpiece.

The encoder 20 also has a lead 39 on which it produces what is termed a synch pulse which is a pulse that occurs at the same exact place on each revolution. The synch pulse is employed to simultaneously initiate the passage of encoder pulses through both gates 22 and 23. The lead 39 is connected as an input to an AND gate 40 which also has an input connected to receive a signal from a switch 41 (which may be part of the numerical control system). The output of the AND gate 40 is connected to the R terminal of a flip-flop 42. Upon the switch 41 being placed to its "on" position, the occurrence of the next synch pulse causes the flip-flop 42 to assume a state wherein its terminal Q which is connected as an input to the AND gates 22 and 23 becomes a binary 1. When this occurs, and the other AND gate inputs are also a 1, encoder pulses, received on the lead 21 pass into their respective paths.

The counters 25 and 35 are required to be set to the value of the movement in steps on their respective axes so that the leads 31 and 38 will indicate that their respective counters have a count and hence that further movement is required. These leads are connected as inputs to their respective AND gates 23 and 22.

It is preferred to program the system so that the tool 15 begins at a point 43 which is somewhat away from the workpiece and terminates at a point 44 which is also somewhat away from the workpiece. The starting away from the workpiece provides time for both motors 16 and 18 to accelerate to the rate determined by their respective command pulses. Thus, with the tool positioned at the point 43, the values of K and L applied to the dividers, the value of the counter 25 set to the number of steps along the lead axis from the point 43 to the point 44, the counter 35 set to the number of steps from point 43 outward to the point 44 and with the tool rotating, the switch 41 is ready to be closed. After closure, the occurrence of the first synch pulse, causes the flip-flop 42 to change its state and encoder pulses on the lead 21 will be passed through to the AND gates to the counters 24 and 32. Each error register supplies a command pulse whenever its count goes negative to thereby cause their respective motor to produce a step.

As the workpiece continues rotating, the motor controls will accelerate the motors to the rate dictated by the rate of their command pulses and then the tool 15 will approach and begin to cut the tapered thread in the work. Upon the reaching of point 44, the counters 25 and 35 will each attain a zero count which prevents further passage of encoder pulses through the gates 22 and 23 and thus stops movement of the tool. Also it will be noted that the flip-flop 42 may be returned to its set condition by operation of the switch 41 to its "off" position after completion of the movement.

Accordingly, it will be understood that there has been disclosed a numerical control system that is capable of forming a tapered thread on a workpiece that is rotated in a lathe. The system includes a motor for moving a cutting tool along the lead axis of the workpiece an equal length step for each command pulse it receives and also a radius axis motor for moving the cutting tool along the radius of the workpiece an equal length step for each command pulse it receives. Both trains of command pulses are derived from an encoder that is rotated with the workpiece and the command pulses for each are obtained by effectively dividing the number of encoder pulses by a set number so that each produces for each revolution the number of increments of movement that each motor is to produce. Thus, by utilizing the encoder pulses simultaneously to control both lead axis movement and radius axis movement the present system assures that there will be synchronism between these two movements and also synchronism with the rotation of the workpiece.

Variations and modifications may be made within the scope of the claims and portions of the improvements may be used without others.

I claim:

1. A numerical control system for use with a lathe to produce a tapered thread on a workpiece mounted for rotational movement comprising means for supporting a thread cutting tool for movement along a first axis for setting the lead of a thread and a second axis for setting the taper of the thread, means for receiving a command for the extent of movement along the first axis for each revolution and the extent of movement along the second axis for each revolution, motor means connected to each axis for producing an incremental movement on each axis essentially simultaneously with receipt of a command pulse, means for producing a fixed number of encoder pulses for each rotation of the workpiece, first means for receiving the encoder pulses and producing command pulses numerically equal to the extent commanded to the first axis for each fixed number of encoder pulses, second means for receiving encoder pulses and producing command pulses numerically equal to the extent commanded to the second axis for each fixed number of encoder pulses, means for causing both the first and second means to receive encoder pulses simultaneously and in which the first means and the second means each includes an error register having a terminal for indicating one direction of its count with each appearance of the indication producing a command pulse, means for changing the error register count in its one direction a number equal to the extent commanded for its axis for each encoder pulse and means for changing the count of the error register in the other direction a number equal to the fixed number of encoder pulses for each command pulse.

2. The invention as defined in claim 1 in which there is a synch pulse produced at the same position in each revolution and means for using the synch pulse to initiate reception of encoder pulses by both the first and second means.

3. The invention as defined in claim 1 in which the number of command pulses from the first means is equal to the number of increments of movement in one lead of the thread and in which a command pulse is produced for essentially the same number of encoder pulses.

4. The invention as defined in claim 1 in which the number of command pulses from the second means is equal to the number of increments of movement that the radius of the thread changes in one lead of the thread and in which a command pulse is produced for essentially the same number of encoder pulses.

* * * * *